(12) United States Patent
Avudaiyappan (10) Patent No.: US 10,073,780 B2
(45) Date of Patent: *Sep. 11, 2018

(54) METHODS AND SYSTEMS FOR TRACKING ADDRESSES STORED IN NON-HOME CACHE LOCATIONS

(71) Applicant: Intel Corporation, Santa Clara, CA (US)

(72) Inventor: Karthikeyan Avudaiyappan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/515,333

(22) Filed: Oct. 15, 2014

(65) Prior Publication Data

US 2016/0110294 A1     Apr. 21, 2016

(51) Int. Cl.
  *G06F 12/0831*     (2016.01)
  *G06F 12/0817*     (2016.01)

(52) U.S. Cl.
  CPC ...... *G06F 12/0833* (2013.01); *G06F 12/0824* (2013.01)

(58) Field of Classification Search
  CPC .............................. G06F 12/121; G06F 12/126
  See application file for complete search history.

(56) References Cited

U.S. PATENT DOCUMENTS

| | | | | |
|---|---|---|---|---|
| 2004/0073769 | A1* | 4/2004 | Debes | G06F 12/0875 711/217 |
| 2005/0188156 | A1* | 8/2005 | Mukker | G06F 12/128 711/129 |
| 2008/0040547 | A1* | 2/2008 | Abadeer | G06F 12/0864 711/128 |
| 2012/0159080 | A1* | 6/2012 | Donley | G06F 12/0806 711/141 |
| 2014/0019686 | A1 | 1/2014 | Dong | |
| 2014/0136773 | A1 | 5/2014 | Michalak | |

OTHER PUBLICATIONS

Final Office Action from U.S. Appl. No. 14/515,345, dated Jul. 27, 2017, 16 pages.
Non-Final Office Action from U.S. Appl. No. 14/515,345, dated Nov. 17, 2017, 16 pages.
Non-Final Office Action from U.S. Appl. No. 14/515,345, dated Jan. 23, 2017, 12 pages.

* cited by examiner

*Primary Examiner* — Adam M Queler
*Assistant Examiner* — Edmond H Kwong
(74) *Attorney, Agent, or Firm* — NDWE LLP (57) ABSTRACT

Systems and methods for tracking addresses stored in non-home locations in a cache. A method includes determining if an address that is to be stored in a cache is to be stored in a non-home location, determining if a directory has a location available for storing an identifier of the non-home location and if one or more locations of the directory are available for storing an identifier of the non-home location, storing an identifier of the non-home location in one of the one or more locations of the directory. The method further includes invalidating a non-home location in the cache that corresponds to one of the one or more locations of the directory, if none of the one or more locations of the directory are available for storing an identifier of the non-home location, and storing an identifier of the non-home location in the one of the one or more locations.

20 Claims, 5 Drawing Sheets

A                                                                                    DNHL 103b

| Valid | SpecialCache Set, Way | Valid | SpecialCache Set, Way |
|---|---|---|---|
| 0 |  | 0 |  |

Set 0, Way 0　　　　　　　　　　　　　Set 0, Way 1

B                                                                                    DNHL 103b

| Valid | SpecialCache Set, Way | Valid | SpecialCache Set, Way |
|---|---|---|---|
| 1 | 1, 0 | 0 |  |

Set 0, Way 0　　　　　　　　　　　　　Set 0, Way 1

C                                                                                    DNHL 103b

| Valid | SpecialCache Set, Way | Valid | SpecialCache Set, Way |
|---|---|---|---|
| 0 | 1, 0 | 0 | 2, 0 |

Set 0, Way 0　　　　　　　　　　　　　Set 0, Way 1

D                                                                                    DNHL 103b

| Valid | SpecialCache Set, Way | Valid | SpecialCache Set, Way |
|---|---|---|---|
| 0 | 3, 0 | 0 | 2, 0 |

Set 0, Way 0　　　　　　　　　　　　　Set 0, Way 1

METHODS AND SYSTEMS FOR TRACKING ADDRESSES STORED IN NON-HOME CACHE LOCATIONS

A cache in a central processing unit is a data storage structure that is used by the central processing unit of a computer to reduce the average time that it takes to access memory. It is a memory which stores copies of data that are located in the most frequently used main memory locations. Moreover, it is memory that is smaller, and that may be accessed more quickly, than main memory. There are several different types of caches.

Cache pollution can occur when an executing computer program loads data into CPU cache unnecessarily. This can cause data that is needed, to be evicted from the cache into lower levels of the memory hierarchy, potentially all the way down to main memory, resulting in performance degradation. Cache maintenance involves the invalidation of unneeded data in the cache for purposes of preventing performance degradation.

In conventional caches the locations where a cache line can reside are a function of a main memory address that is associated with the cache line. These locations in caches are called the home locations for the address. Because addresses are known, future accesses to the place in a cache where a cache line resides, including for purposes such as the invalidation of unneeded data, involves a look up that is straightforward. However, such a dependence on the knowledge of specific addresses to identify cache lines can limit extensions of the cache's functionality.

SUMMARY

Some conventional systems depend on the knowledge of specific addresses in order to identify cache lines for invalidation purposes. This can limit an extension of such cache's functionality. Embodiments allow the storage of cache lines in cache locations that both are, and are not, a function of their addresses (in home locations and non-home locations respectively). Embodiments include a directory of non-home locations (DNHL) that enables a cache system to track, and limit the proliferation of, non-home locations. Conventional systems are not equipped to manage caches that maintain cache lines in both home locations and non-home locations. A method for tracking addresses stored in non-home locations in a cache is disclosed that addresses these shortcomings. However, the claimed embodiments are not limited to implementations that address any or all of the aforementioned shortcomings. As a part of the aforementioned method, it is determined if an address that is to be stored in a cache is to be stored in a non-home location, it is determined if a directory has a location available for storing an identifier of the non-home location, and, if one or more locations of the directory are available for storing an identifier of the non-home location, an identifier of the non-home location is stored in a location of the directory. Further, if none of the one or more locations of the directory are available for storing an identifier of the non-home location, a non-home location in the cache that corresponds to one of the one or more locations of the directory is invalidated, and an identifier of the non-home location is stored in a newly available location of the directory. Because addresses placed in non-home locations can be tracked and these locations pin pointed, cache maintenance activities such as invalidation of addresses placed in non-home locations can be executed deterministically. As such cache performance degradations related to the proliferation of addresses being in multiple non-home locations is avoided and invalidation of a cache line is successfully carried out even if the address is present in a non-home location.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "maintaining" or "determining" or "invalidating" or "storing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

As used herein, references to a store instruction having "addresses" is intended to refer to addresses that are associated with a cache line that is stored in cache or to be stored in cache.

In one embodiment, the cache complex described herein accommodates the placement of some addresses in their home locations, while other addresses are placed in non-home locations. A home location of an address can be computed using a function of the address. In contrast, a non-home location of an address can be computed using a function that may not computationally involve the address, but can involve other variables.

In exemplary embodiments, if the location of a cache line in a cache is not a function of the address of the cache line but is instead a function of another address (which is termed an indirect address) which has a relationship to the address of the cache line, such a location is called a non-home location of that cache line. In one embodiment, a cache is described in which a cache line may advantageously reside either in its home location or in a non-home location of a cache. Future accesses to locate a cache line in the non-home location can be performed if: (1) the address of the cache line, and (2) the indirect address of the cache line, are known at the time of access.

In some conventional systems, a function of software is to invalidate one or more cache lines from caches. To accomplish this, the software has to provide a cache with the addresses of the cache lines to be invalidated. However, software may not be able to provide a cache with an indirect address of a cache line that it seeks to invalidate. Consequently, if a cache line resides in a non-home location, the cache structure may not be able to locate the non-home location of the cache line to be invalidated. In accordance with one embodiment, the manner in which a cache line may be identified and invalidated, given such circumstances, is described herein. Moreover, systems for, and methods of, tracking and limiting the proliferation of cache lines that are stored in non-home locations of a cache are provided.

Figure 1A:
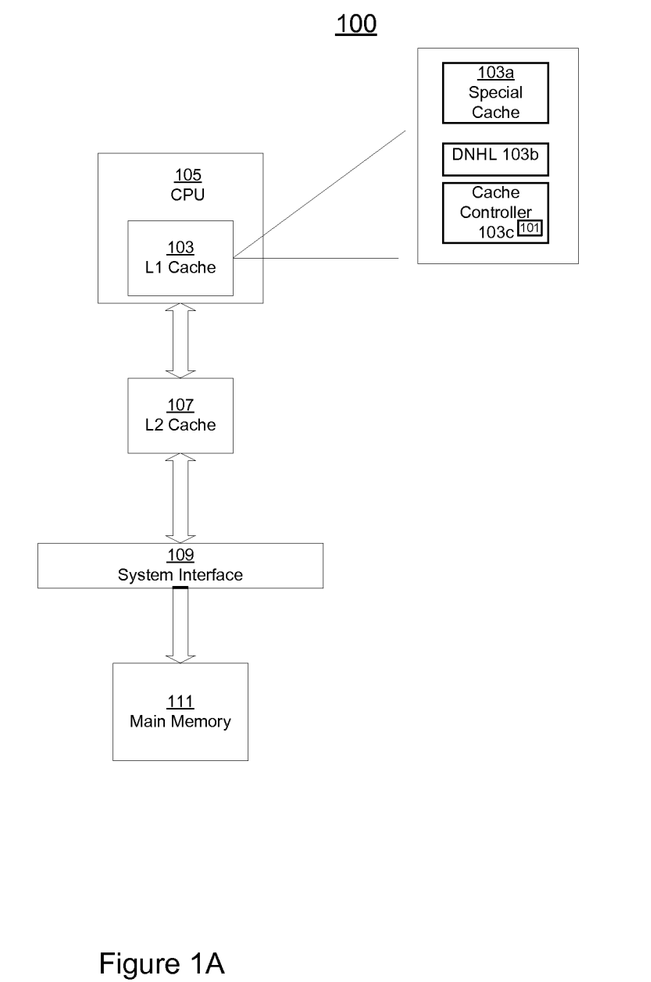
FIG. 1A shows an exemplary operating environment of a system for tracking addresses stored in non-home locations in a cache according to one embodiment.

Exemplary Operating Environment of a System for Tracking Addresses Stored in Non-Home Cache Locations According to One Embodiment FIG. 1A shows an exemplary operating environment 100 of system 101 for tracking addresses stored in non-home locations of a cache system according to one embodiment. System 101 tracks addresses (that are associated with cache lines) that are stored in non-home locations of a cache system and limits the proliferation of the addresses in the cache system. Because system 101 enables addresses placed in non-home locations in a cache system to be tracked and their locations pinpointed, cache maintenance activities such as invalidation of addresses placed in non-home locations in the cache system, to prevent the proliferation of addresses therein, can be executed deterministically. As such, cache performance degradation related to the proliferation of addresses in the cache is prevented. FIG. 1A shows system 101, level one (L1) cache 103, special cache 103a, DNHL 103b, cache controller 103c, CPU 105, level two (L2) cache 107, system interface 109 and main memory 111.

Referring to FIG. 1A, level one (L1) cache 103 is the primary cache of the processor, and is a data storage component which can be integrated with the CPU 105 core. L1 cache 103 is used to store information recently accessed by CPU 105. In one embodiment, L1 cache 103 can include special cache 103a that includes non-home locations of L1 cache 103. In one embodiment, special cache 103a can reside in L1 cache as shown in FIG. 1A. In other embodiments, special cache 103a can reside in other places. In addition, in one embodiment, L1 cache can include DNHL 103b which is a directory that is used to track addresses stored in non-home locations in special cache 103a. In one embodiment, L1 cache 103 can include cache controller 103c. In one embodiment, system 101 (see discussions that are provided herein below that describe in detail the operation of systems 101) can reside in cache controller 103c. L2 cache 107 is the secondary cache of CPU 105 and like L1 cache 103 is used to store recently accessed information. In the FIG. 1A embodiment, L2 cache 107 interfaces with the external fabric and is generally accessed for data before main memory 111.

As previously discussed, system 101 tracks addresses (that are associated with cache lines) that are stored in non-home locations in a cache system and limits the proliferation of the addresses in the cache system. In one embodiment, by keeping track of the addresses that are stored in non-home locations, the identification of the address locations for purposes of invalidation as a part of cache maintenance is straightforward (e.g., DNHL is referenced for location of address). In one embodiment, system 101 tracks addresses stored in non-home locations by recording identifiers of the non-home locations in DNHL 103b. In one embodiment, the identifiers can be stored either: (1) if space is available in DNHL 103b, or, (2) if space is not available in DNHL 103b and a non-home location is invalidated with a corresponding space being made available in DNHL 103b. As discussed above, in one embodiment, system 101 can reside in cache controller 103c. In other embodiments, system 101 can reside in other locations. In one embodiment, DNHL 103b can reside in L1 cache 103. In other embodiments, DNHL 103b can reside in other locations.

Referring again to FIG. 1A, main memory 111 includes physical addresses that store information that is copied into L1 cache 103 and L2 cache 107. Also shown in FIG. 1A is system interface 109.

Advantages of exemplary embodiments include the avoidance of cache pollution and capacity reduction due to excessive duplication of copies of the same addresses in the cache complex. And, for cache maintenance purposes, the provision of a straightforward look up process for addresses that are stored in multiple non-home locations.

Operation

Figure 1B:
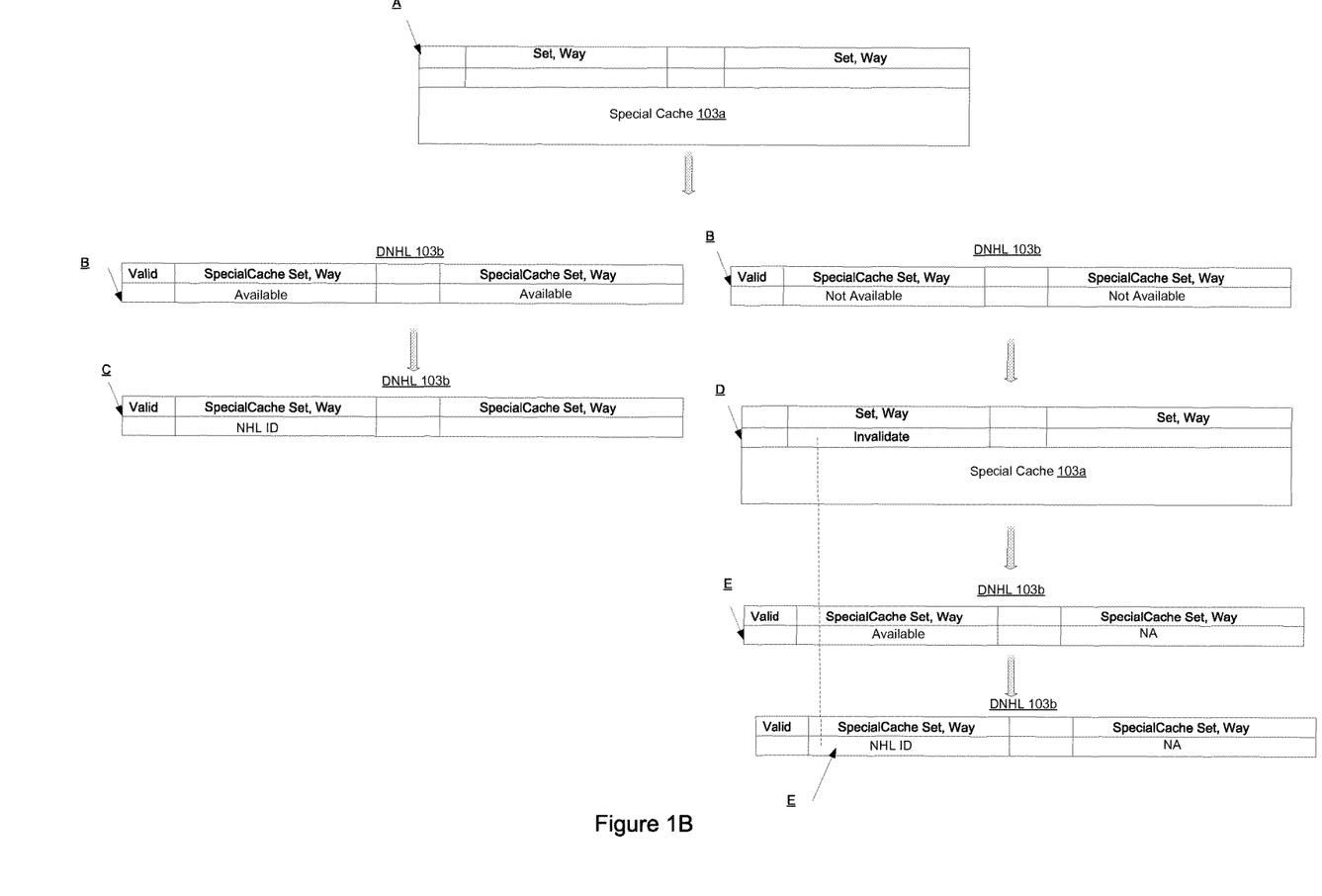
FIG. 1B illustrates operations performed by a system for tracking addresses stored in non-home locations in a cache according to one embodiment.
Figure 1C:
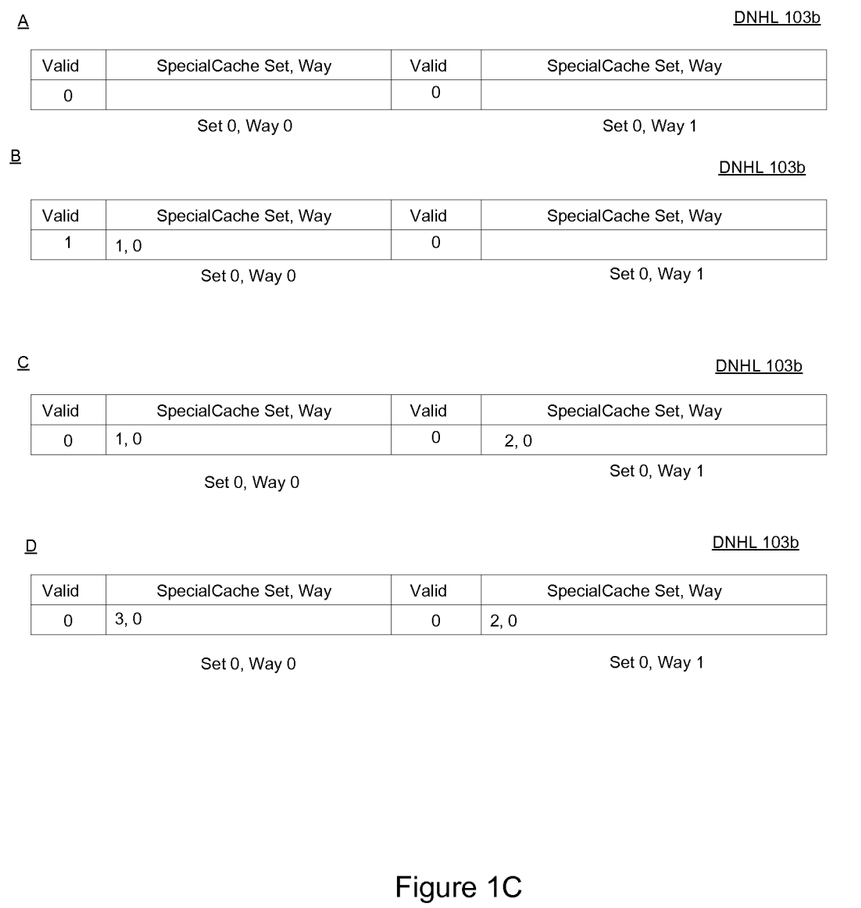
FIG. 1C illustrates operations performed by a system for tracking addresses stored in non-home locations in a cache according to one embodiment.

FIGS. 1B and 1C illustrate operations performed by system 101 for tracking addresses stored in non-home locations of a cache system according to one embodiment. These operations, which relate to tracking addresses stored in non-home locations in a cache system, are only exemplary. It should be appreciated that other operations not illustrated in FIGS. 1B and 1C can be performed in accordance with one embodiment.

Referring to FIG. 1B, at A, system 101 (of FIG. 1A) determines if an address (that is associated with a cache line) that is to be stored in cache is to be stored in a non-home location in special cache 103*a*.

At B, system 101 determines if DNHL 103*b* has a location available for storing an identifier of the non-home location.

At C, if one or more locations of DNHL 103*b* are available for storing an identifier of the non-home location, system 101 stores an identifier of the non-home location in one of the one or more locations of DNHL 103*b*.

At D, if none of the one or more locations of DNHL 103*b* are available for storing an identifier of the non-home location, a non-home location in special cache 103*a* with an identifier already stored in one of the one or more locations of DNHL 103*b* is invalidated, and, at E, an identifier of the non-home location where an address is to be installed in special cache 103*a* is stored in the location of DNHL 103*b* that is made available from the invalidation.

Example

FIG. 1C illustrates operations performed by system 101 for tracking addresses stored in non-home locations of a cache system where an address 0x0 is installed in a plurality of locations of a special cache 103*a* and is tracked and limited by system 101 using DNHL 103*b* according to one embodiment. Consequently, the proliferation of a single address (that is associated with a cache line) in special cache 103*a* is limited to two locations (associated with location identifiers stored in way 0 and way 1 of DNHL 103*b*). In the FIG. 1C example, a single set of DNHL 103*b*, set 0, with 2 ways, way 0 and way 1, is described as the other sets of DNHL 103*b* operate similarly according to one embodiment.

At A, at time T0, after reset, the valid bits of DNHL 103*b* Set0 are set to 0. More specifically, all storage locations of DNHL 103*b* are available.

At B, at time T1 address 0x0 is installed in an available non-home location of special cache 103*a*, for example, in special cache set1 way0. DNHL 103*b* tracks this non-home location, for example, by storing an identifier of special cache set 1 way 0 in DNHL 103*b* set 0 way 0. More specifically, special cache 103*a* set 1 way 0 is indicated as being valid and identifier special cache—set 1 way 0 is stored in DNHL 103*b*. Thereafter, address 0x0 is installed in special cache non-home location set 1 way 0.

At C, at time T2, address 0x0 is installed in another available non-home location of special cache 103*a*, for example, in special cache set 2 way 0. DNHL 103*b* tracks this non-home location, for example, by storing an identifier of special cache set 2 way 0 in DNHL 103*b* set 0 way 1. More specifically, DNHL 103*b* set 0 way 1 is indicated as being valid and identifier special cache—set 2 way 0 is stored in DNHL 103*b* and address 0x0 is installed in special cache special non-home location set 2 way 0.

At D, at time T3, a request is made to install address 0x0 into yet another non-home location in special cache 103*a*. However, because DNHL 103*b* set 0 has no empty/invalid way remaining in which to record and track a third non-home location of address 0x0 in special cache 103*a*, address 0x0 is not installed in the non-home location. Responsive to address 0x0 not being installed in special cache 103*a*, special cache 103*a* is instructed to invalidate special cache set 1 way 0 such that the space in DNHL 103*b* where the identifier of special cache set 1 way 0 resides is made available to record an identifier of the new non-home location (special cache set3 way0) in special cache 103*a* where address 0x0 is to be installed. This new non-home location, special cache set 3 way 0, is tracked in DNHL 103*b* set 0 way 0.

In the aforementioned example, because DNHL 103*b* has two ways, it can track two non-home locations, in special cache 103*a*, of addresses that map to the same set in DNHL 103*b*. Thus, DNHL 103*b* limits the number of non-home locations of addresses in special cache 103*a*.

Figure 2:
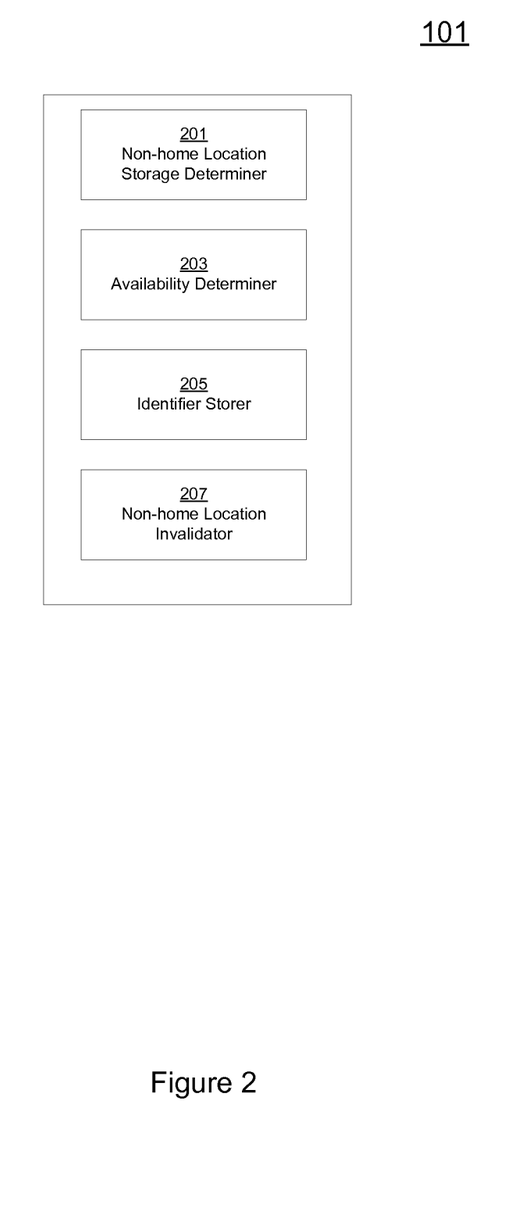
FIG. 2 shows components of a system for tracking addresses stored in non-home locations in a cache according to one embodiment.

Components of System for Tracking Addresses Stored in Non-Home Cache Locations According to One Embodiment FIG. 2 shows components of a system 101 for tracking addresses (that are associated with cache lines) stored in non-home locations in a cache according to one embodiment. In one embodiment, components of system 101 implement an algorithm for tracking addresses in non-home locations in a cache (e.g., L1 cache 103 in FIG. 1A). In the FIG. 2 embodiment, components of system 101 include non-home location storage determiner 201, availability determiner 203, identifier storer 205, non-home location invalidator 207.

Referring to FIG. 2, non-home location storage determiner 201 determines if an address that is to be stored in a cache (e.g., L1 cache 103 in FIG. 1A) is to be stored in a non-home location of the cache. In one embodiment, non-home location storage determiner 201 makes the determinations based on requests and/or attempts that are made to store addresses in the cache.

Availability determiner 203 determines if the DNHL 103*b* has a location available for storing an identifier of the non-home location. This determination is made in response to a request and/or an attempt to store an address in the cache. In one embodiment, the determination can be made based on the data that is stored in DNHL 103*b* when the request and/or the attempt to store an address in the cache is made. In one embodiment, the outcome of the determination can result in the storing of an identifier in DNHL 103*b* or in the invalidation of a non-home location in a cache component that facilitates the storage of addresses that are stored in non-home locations (in special cache 103*a* in FIG. 1A).

Identifier storer 205 stores an identifier of a non-home location in one of a plurality of locations of DNHL 103*b*, if one or more locations of DNHL 103*b* are available for storing an identifier of the non-home location. In one embodiment, the identifier provides a means of tracking the addresses that are stored in non-home locations in the cache (e.g., special cache 103*a* in FIG. 1A) by identifying its specific non-home location.

Non-home location invalidator 207 invalidates a non-home location of an address in the cache that has an identifier stored in DNHL 103*b* if none of the locations of DNHL 103*b* are available for storing an identifier of a new non-home location for an address. In one embodiment, the invalidation of a non-home location in the cache results in the availability of a location in DNHL 103*b* to store an identifier of the new non-home location. In one embodiment, the newly available space can be used to store an identifier of the new non-home location where an address is sought to be stored/installed.

It should be appreciated that the aforementioned components of system 101 can be implemented in hardware or software or in a combination of both. In one embodiment, components and operations of system 101 can be encompassed by components and operations of one or more computer components (e.g., cache controller 103*c*). In another embodiment, components and operations of system 101 can be separate from the aforementioned one or more computer components but can operate cooperatively with components and operations thereof.

Figure 3:
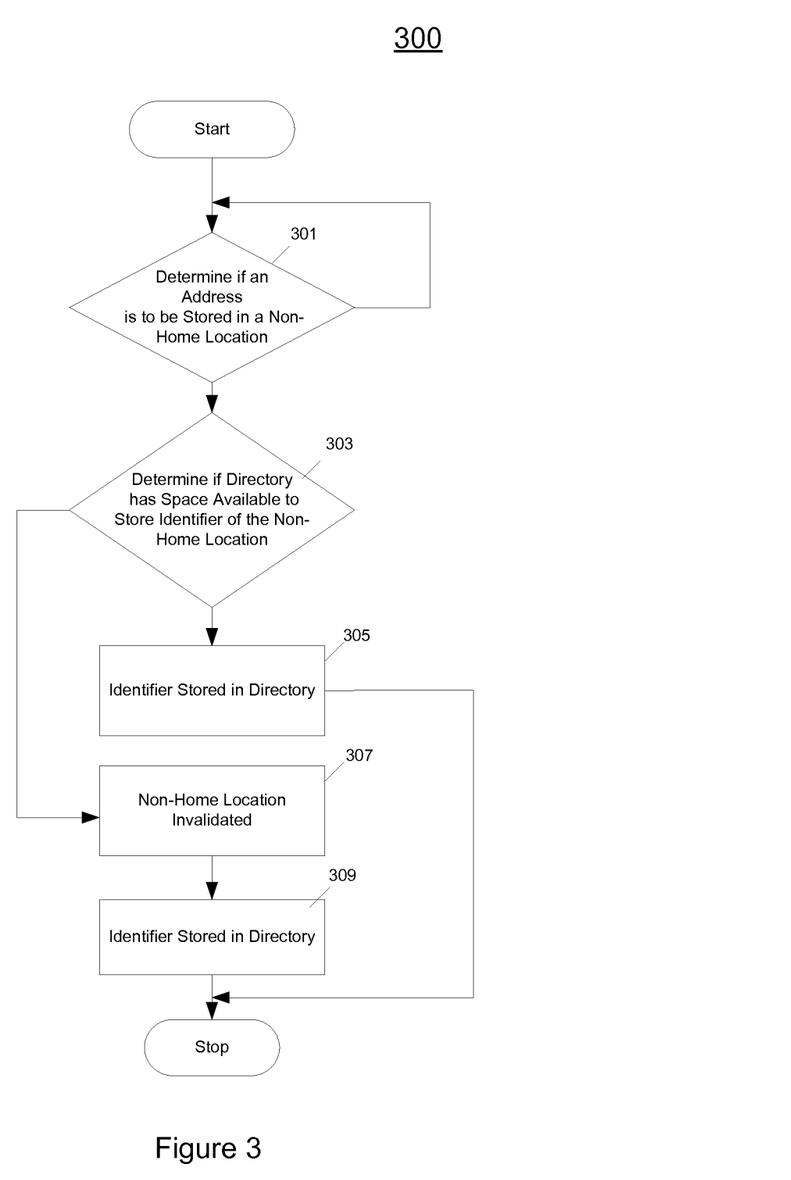
FIG. 3 shows a flowchart of the steps performed in a method for tracking addresses stored in non-home locations in a cache according to one embodiment.

Method for Tracking Addresses Stored in Non-Home Cache Locations According to One Embodiment FIG. 3 shows a flowchart 300 of the steps performed in a method for tracking addresses stored in non-home locations according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, it is determined if an address (that is associated with a cache line) that is to be stored/installed in a cache (e.g., L1 cache 103 in FIG. 1A) is to be stored in a non-home location in the cache (e.g., in special cache 103*a* in FIG. 1A). If it is determined that the address to be stored in the cache is to be stored in a non-home location in the cache, 303 is executed. If it is determined that the address to be stored in the cache is not to be stored in a non-home location, 301 is repeated for the next store request and/or attempt.

At 303, it is determined if a directory (e.g., DNHL 103*b* in FIG. 1A) has a location available for storing an identifier of a non-home location. If it is determined that the directory has a location available for storing an identifier of the non-home location, 305 is executed. If it is determined that the directory does not have a location available for storing an identifier of the non-home location, 307 is executed.

At 305, if one or more locations of the directory are available for storing an identifier of the non-home location, an identifier of the non-home location is stored in one of the one or more locations of the directory.

At 307, if none of the one or more locations of the directory are available for storing an identifier of the non-home location, a non-home location in the cache that has an identifier stored in one of the one or more locations of the directory is invalidated, and, at 309, an identifier of the non-home location into which the address is sought to be stored/installed is stored/installed in that location of the directory.

With regard to exemplary embodiments thereof, systems and methods for tracking addresses stored in non-home locations in a cache. A method includes determining if an address (that is associated with a cache line) that is to be stored in a cache is to be stored in a non-home location, determining if a directory has a location available for storing an identifier of the non-home location and if one or more locations of the directory are available for storing an identifier of the non-home location, storing an identifier of the non-home location in one of the one or more locations of the directory. The method further includes invalidating a non-home location in the cache that corresponds to one of the one or more locations of the directory (e.g., has an identifier stored in a location of the directory), if none of the one or more locations of the directory are available for storing an identifier of the non-home location, and storing an identifier of the non-home location in the one of the one or more locations.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

I claim:

1. A method of tracking addresses stored in non-home locations in a cache, said method comprising:
    determining if a cache line with an associated address that is to be stored in the cache is to be stored in a non-home location, wherein the cache line with the associated address is stored in a non-home location when a location for storing the cache line is not a function of the associated address of the cache line;
    determining if a directory has a location available for storing an identifier of said non-home location;
    if one or more locations of a directory are available for storing an identifier of said non-home location, storing an identifier of said non-home location in one of said one or more locations of said directory; and
    if none of said one or more locations of said directory are available for storing an identifier of said non-home location, invalidating a non-home location in said cache that corresponds to one of said one or more locations of said directory and storing an identifier of said non-home location in said one of said one or more locations.

2. The method of claim 1 wherein said cache is exclusively for storage of content in non-home locations.

3. The method of claim 1 wherein said directory records all non-home locations associated with an address in said cache.

4. The method of claim 1 wherein a predetermined number of identifiers of said non-home locations associated with an address are enabled to be recorded.

5. The method of claim 1 wherein said cache is configured to accommodate a predetermined number of non-home locations.

6. The method of claim 1 wherein said directory has a predetermined number of ways and a predetermined number of sets.

7. The method of claim 1 wherein said cache is a two way associative cache.

8. A cache memory controller for tracking addresses stored in non-home locations in a cache, wherein the cache memory controller is to:
- determine if a cache line with an associated address that is to be stored in the cache is to be stored in a non-home location, wherein the cache line with the associated address is stored in a non-home location when a location for storing the cache line is not a function of the associated address of the cache line;
- determine if a directory has a location available for storing an identifier of said non-home location;
- store an identifier of said non-home location in one of said one or more locations of said directory, if one or more locations of said directory are available for storing an identifier of said non-home location; and
- invalidate a non-home location in said cache that corresponds to one of said one or more locations of said directory if none of said one or more locations of said directory are available for storing an identifier of said non-home location, and facilitate a storing of an identifier of said non-home location in said one of said one or more locations.

9. The cache memory controller of claim 8 wherein said cache is exclusively for storage of content in non-home locations.

10. The cache memory controller of claim 8 wherein said directory records all non-home locations associated with an address in said cache.

11. The cache memory controller of claim 8 wherein a predetermined number of identifiers of said non-home locations associated with an address are enabled to be recorded.

12. The cache memory controller of claim 8 wherein said cache is configured to accommodate a predetermined number of non-home locations.

13. The cache memory controller of claim 8 wherein said directory has a predetermined number of ways and a predetermined number of sets.

14. The cache memory controller of claim 8 wherein said cache is a two way associative cache.

15. A processor for tracking addresses stored in non-home locations in a cache, wherein the processor is to:
- determine if a cache line with an associated address that is to be stored in the cache is to be stored in a non-home location, wherein the cache line with the associated address is stored in a non-home location when a location for storing the cache line is not a function of the associated address of the cache line;
- determine if a directory has a location available for storing an identifier of said non-home location;
- store an identifier of said non-home location in one of said one or more locations of said directory, if one or more locations of a directory are available for storing an identifier of said non-home location; and
- invalidate a non-home location in said cache that corresponds to one of said one or more locations of said directory if none of said one or more locations of said directory are available for storing an identifier of said non-home location, and facilitate a storing of an identifier of said non-home location in said one of said one or more locations.

16. The processor of claim 15 wherein said cache is exclusively for storage of content in non-home locations.

17. The processor of claim 15 wherein said directory records all non-home locations associated with an address in said cache.

18. The processor of claim 15 wherein a predetermined number of said non-home locations associated with an address are enabled to be recorded.

19. The processor of claim 15 wherein said cache is configured to accommodate a predetermined number of non-home locations.

20. The processor of claim 15 wherein said directory has a predetermined number of ways and a predetermined number of sets.

* * * * *